Patented Mar. 2, 1943

2,312,404

UNITED STATES PATENT OFFICE 2,312,404

METHOD OF PREPARING N-SULPHONYL-UREAS

Erich Haack, Radebeul, near Dresden, Germany; vested in the Alien Property Custodian No Drawing. Application December 7, 1940, Serial No. 369,117. In Germany November 22, 1939

8 Claims. (Cl. 260—397.7)

As a general rule urea derivatives of aromatic sulphonic acids which are substituted at the nitrogen cannot be prepared in the simple manner of a reaction of ureas upon sulphonyl chlorides, as it is the case in obtaining the corresponding urea derivatives of the organic carboxylic acids. It is true that hydrogenchloride is split off during the reaction, if we attempt such a reaction between urea and sulphonyl chloride; still we do not obtain the sulphonylureas, but merely sulphonic acids alongside of products derived from urea by splitting off water, or products of polymerisation thereof, such as dicyandiamide.

It has now been discovered, that a good yield of the desired N-sulphonylureas may easily be obtained in a roundabout way:

First the corresponding N-sulphonylisoureaalkylethers are prepared, which are then split into N-sulphonylureas and alkylhalides by treatment with hydrogen halides, e. g. concentrated hydrochloric acid. It was further determined that the N-sulfonyl-isoureaalkylethers are quite easily prepared from the sulphonic acid halides, and the corresponding isoureaethylethers. It is surprising that in the reaction there do not arise complications of the type occurring in an attempted transposition between sulphonyl chloride and urea as first mentioned above..

Of course other methods may be used for preparing the sulphonylisoureaalkylethers; for instance—as far as sulphonyl compounds are suited for this purpose—the method described for acylureas by Wheeler and Johnson, American Chemical Journal 24, page 216 (1900), may be applied. The N-sulphonylureas $$R-SO_2-NR_1-CO-NH-R_2$$

result from sulphonylisoureaalkylethers having the following general formulae:

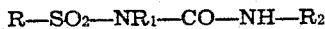

or

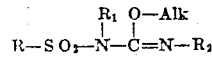

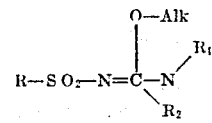

wherein R is an aromatic substituent, $R_1$ and $R_2$ are hydrogen, alkyl, aryl or aralkyl, and Alk is an alkyl or aralkyl radical. The basic properties which these compounds have on account of their isourea constitution, are barely noticeable. The acid properties are more pronounced, if $R_1$ is hydrogen and attaches to the nitrogen atom neighbouring the sulphonyl radical. In that case the compound may be dissolved in a fairly strong caustic soda solution. But the compounds are not soluble in caustic soda solution, when $R_1$ is alkyl or is not attached to the nitrogen atom neighbouring the sulphonyl radical. By reason of this distinction we may separate the isomeric compounds which may be obtained from the mono-substituted isoureaalkylethers substituted by an alkyl radical $R_3$:

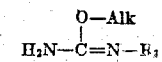

or

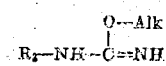

This yields the following sulphonyl compounds:

or

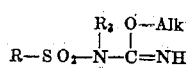

Only the first one of these two isomers is soluble in caustic soda solution.

In case they have a hydrogen atom on the nitrogen atom attached to the sulphonyl radical, the corresponding N-sulphonylureas are strongly acid compounds. Otherwise they are neutral compounds. They are most readily soluble in diluted soda solution, and are thus easily distinguished from the sulphonylisoureaethers. The alkali salts are crystalline compounds, which readily dissolve in water with substantially neutral reaction.

Compounds of this invention may be used for technical as well as medicinal purposes. Of particular value are compounds which have an amino group in p-position to the $SO_2$-group on the aromatic sulphonyl nucleus and also carry a hydrogen atom on the nitrogen atom which is linked to the sulphonyl radical. These compounds serve as remedies for infectious diseases.

The amino group may be introduced as an acylated amino group together with the sulphonic acid component, and subsequently made free by way of saponification. Or it is introduced as a nitro-group which is reduced to an amino group either after the isourea compound or after the urea compound has been prepared.

EXAMPLE 1

*N-benzenesulphonylurea.*—62 gr. of isoureamethylethermethylsulphate (from urea and dimethylsulphate) are dissolved in 100 cc. of water and are mixed with 110 gr. of dry potassium carbonate. 60 gr. of benzenesulphochloride are added while the mixture is being stirred well, the temperature rising to about 60° C. After ten minutes dilute with 250 cc. of water, suck off and wash with water. After drying about 50 gr. of an unpurified colorless powder are obtained, which serves as a basis for the further process and has a melting point of 155°-160° C. But it may be further purified by being repeatedly dissolved in a caustic soda solution and reprecipitated with glacial acetic acid. In the purified state it has a melting point of 164°-165° C.

Splitting off the methyl group 50 gr. of the above unpurified product are heated with 150 cc. of concentrated hydrochloric acid to 60° C. until the evolution of methylchloride, which is very lively at the beginning, has stopped completely. The solid product dissolves clearly during this reaction, but it resolidifies at the end. It is diluted with 250 cc. of water and neutralized with carbonate of soda, being completely dissolved. It is filtered and acidulated with 20 cc. of glacial acetic acid. The product crystallizes out as a white mass and weighs 40 gr. after drying. It may be purified either by dissolving in a soda solution and precipitation by acetic acid or by crystallization from acetone or benzol. The melting point is 170°-171° C.

p-Toluenesulphochloride and isoureamethylether may be reacted upon in like manner and then split by hydrochloric acid. The same ureas may also be obtained by reacting upon isoureaethylether with benzene—or toluenesulphochloride, respectively, and by then splitting off ethylchloride by means of concentrated hydrochloric acid.

EXAMPLE 2

*p-Aminobenzenesulphonylurea.*—300 gr. anhydrous potassium carbonate, 300 cc. of saturated potassium carbonate solution, and 150 gr. of acetylsulphanilylchloride are mixed in several portions with 125 gr. of isoureamethylether-methylsulphate in a closed mixing apparatus, and are then stirred for twelve hours. 400 cc. of water are added and the product is filtered by suction. The moist precipitate is worked through with 800 cc. of a 4% caustic soda solution, sucked off from the insoluble residue and washed with water. After drying 20 gr. of the insoluble acetylsulphanilylchloride are recovered, which have not been reacted upon. The clear solution is precipitated with 100 cc. of glacial acid and is sucked off after a short interval. 100 gr. of raw N-(acetylsulphanilyl)-isoureamethylether are obtained, having a melting point of 188°-198° C. The melting point of the product is 208°-209° C., after it has been repeatedly dissolved in caustic soda solution and reprecipitated with glacial acetic acid.

Splitting off the methyl group and the acetyl group

Both these reactions take place at once, if 100 gr. of the above unpurified product are heated in 150 cc. of concentrated hydrochloric acid for an hour and a half to 60° C. The originally solid mass goes into clear solution, but finally crystallizes again, after the lively evolution of methylchloride is finished. The product is dissolved in water and neutralized by carbonate of soda; after filtering it is precipitated by 40 cc. of glacial acetic acid. Approximately 75 gr. of N-sulphanilylurea are obtained.

Potassium salt

The potassium salt is preferably prepared from a soda solution of the compound which is mixed with an excess of saturated potassium carbonate solution. The potassium salt is precipitated in fine flakes and may be crystallized from hot water. The colorless flakes readily dissolve in cold water with a fully neutral reaction (pH=7). A pure p-aminobenzenesulphonylurea, which decomposes when melted at 149°-154° C., is obtained from the pure potassium salt by precipitation with acetic acid.

The ethyl-, propyl- or higher ethers of the acetylsulphanilylisourea may be prepared in like manner and will yield the same urea when treated with hydrochloric acid, ethylchloride, propylchloride etc. being split off, respectively.

EXAMPLE 3

*N-(p-aminobenzenesulphonyl)-N'N'-dimethylurea.*—300 gr. of potassium carbonate, 300 cc. of saturated potassium carbonate solution, 150 gr. of acetylsulphanilylchloride and 150 gr. N'N'-dimethylisourea - O - methylethermethylsulphate (from unsymmetrical dimethylurea and dimethylsulphate) are stirred for 12 hours in a closed mixing apparatus, water is added, and filtering off under suction and washing with water follow. 90 gr. of a crude acetylsulphanilyldimethylisoureamethylether are obtained as a white powder melting at 136°-144° C.

Splitting off the methylether group 90 cc. of concentrated hydrochloric acid are poured into 90 gr. of the foregoing product. Methylchloride is immediately given off and the process is completed at 45° C. in about 20 minutes. The mass which had dissolved at the beginning is solidified. Water is added and after cooling the product is washed with water. The product is 72-75 gr. of crude acetyl-sulphanilyl-dimethylurea.

Splitting off the acetyl group

This is effected by heating with 2 mols caustic soda in watery solution to 80°-90° C. and o-aminobenzenesulphonyldimethylurea is obtained which melts at 158°-161° C. This is accompanied by decomposition, the residue resolidifies at 171°-173° C. and melts again at 253°-255° C. The sodium salt forms fine needles and is most readily dissolved in water with neutral reaction (pH=7). Similarly other unsymmetrical dialkyl-substituted p-acetylaminobenzenesulphonylureas and p-aminobenzenesulphonylureas may be prepared, such as the corresponding N'N'-diethylurea, the N'N'-dibutylurea or higher dialkyl derivatives; likewise mono-substituted ureas, e. g. the corresponding N'-monomethyl- and N'-monobenzyl- and N'-monophenylurea. Instead of isoureamethylether we may use with like success other alkylethers, e. g. ethyl- or propylether. Instead of the concentrated hydrochloric acid diluted hydrochloric acid or gaseous hydrogen chloride may be used, just as well as hydrobromic or hydroiodic acid.

Having thus given a careful outline of my invention in detail, yet I do not wish it to be limited thereby, except as the state of the art and the appended claims may require, for it is obvious that various modifications and changes may be made in the form of embodiment of my invention, without departing from the spirit and scope thereof.

What I claim is:

1. The process of preparing N-sulphonylureas of the formula

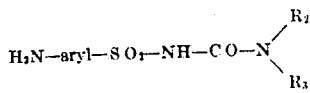

wherein aryl represents a benzene-nucleus, the amino radical H₂N stands in p-position to the sulphonyl group, wherein R₂ stands for a radical selected from the group consisting of hydrogen and alkyl, and wherein R₃ stands for a radical selected from the group consisting of hydrogen, alkyl and aryl, comprising treating a corresponding N-acetyl-sulphanilyl-isoureaalkylether with a hydrogenhalide, until the halide of the alkyl radical of the ether is split off.

2. The process of preparing N-sulphonylureas of the formula

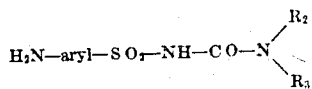

wherein aryl represents a benzene nucleus, the amino radical H₂N stands in p-position to the sulphonyl group, and R₂ and R₃ stand for radicals selected from the group consisting of hydrogen and alkyl, comprising treating a corresponding N-sulphonylisoureaalkylether with concentrated hydrochloric acid under heat at temperatures ranging up to 100°, until the alkyl radical of the ether has been split off in the form of alkyl chloride.

3. The process of preparing N-sulphonylurea of the formula

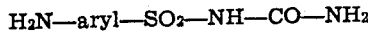

wherein aryl is a benzene nucleus, comprising treating a corresponding N-acetyl-sulphanilylisoureaalkylether with a hydrogenhalide until the halide of the alkyl radical of the ether and the acetyl radical are split off.

4. The process of preparing N-sulphonylurea of the formula

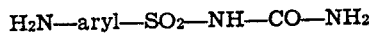

wherein aryl is a benzene nucleus, comprising treating a corresponding N-acetyl-sulphanilyliso- ureaalkylether with a hydrogenhalide until the halide of the alkyl radical of the ether is split off, and saponifying the acetyl radical.

5. The process of preparing N-sulphonylurea of the formula

wherein aryl is a benzene nucleus, and wherein R₂ means an alkyl radical, comprising treating a corresponding N-acetyl-sulphanilylisoureaalkylether with a hydrogenhalide until the halide of the alkyl radical of the ether and the acetyl radical are split off.

6. The process of preparing N-sulphonylurea of the formula

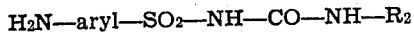

wherein aryl is a benzene nucleus, and wherein R₂ and R₃ stands for alkyl, comprising treating a a corresponding N-acetyl-sulphanilyl-isoureal- kylether with a hydrogenhalide until the halide of the alkyl radical of the ether is split off, and saponifying the acetyl radical.

7. The process of preparing N-sulphonylurea of the formula

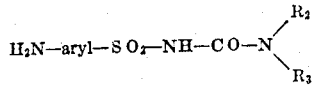

wherein aryl is a benzene nucleus, and wherein R₂ and R₃ stand for alkyl, comprising treating a corresponding N - acetyl-sulphanilyl - isoureaalkylether with a hydrogenhalide until the halide of the alkyl radical of the ether and the acetyl radical are split off.

8. The process of preparing N-sulphonylurea of the formula

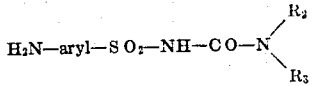

wherein aryl is a benzene nucleus, and wherein R₂ and R₃ stand for alkyl, comprising treating a corresponding N-acetyl-sulphanilyl-isoureaalkylether with a hydrogenhalide until the halide of the alkyl radical of the ether is split off, and saponifying the acetyl radical.

ERICH HAACK.